(No Model.)

J. A. BELL.
COMMODE.

No. 401,629. Patented Apr. 16, 1889.

Witnesses.
F. P. Davis,
J. B. Macauley.

Inventor.
John A. Bell
per R. H. Du Bois
his Attorney

UNITED STATES PATENT OFFICE.

JOHN A. BELL, OF NAPERVILLE, ILLINOIS.

COMMODE.

SPECIFICATION forming part of Letters Patent No. 401,629, dated April 16, 1889.

Application filed December 21, 1888. Serial No. 294,251. (No model.)

*To all whom it may concern:*

Be it known that I, JOHN A. BELL, a citizen of the United States, residing at Naperville, in the county of Du Page and State of Illinois, have invented certain new and useful Improvements in Commodes; and I do hereby declare the following to be a full, clear, and exact description of the invention, such as will enable others skilled in the art to which it appertains to make and use the same.

My invention relates to an adjustable commode or dry closet.

The object I have in view is to construct the device in such a manner that it can be easily adjusted to any desired height in order to accommodate adults or children, as well as to enable it to be reduced to a very small compass and used as an article of household furniture from which the idea of a commode is entirely eliminated.

With these ends in view my invention consists in the peculiar features and combination of elements more fully described hereinafter, and pointed out in the claims.

Figure 1:
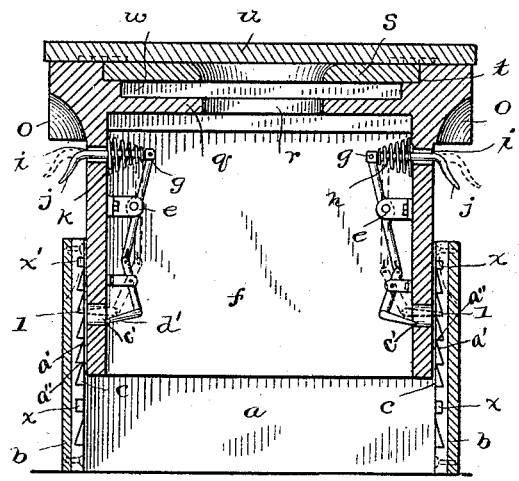
Figure 2:
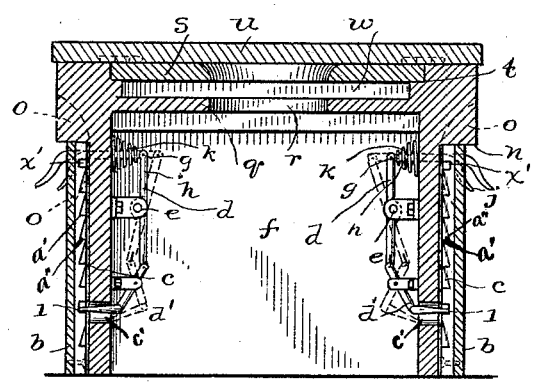
Figure 3:
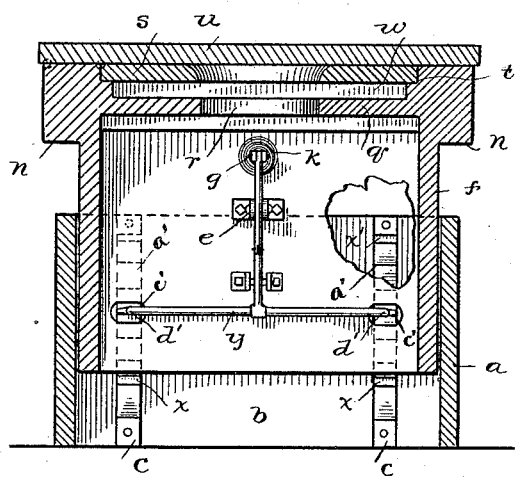

In the accompanying drawings, Figure 1 represents a sectional front elevation of the commode in raised adjustment; Fig. 2, a similar view showing it closed down and reduced to its smallest compass; and Fig. 3, a side elevation in cross-section exposing the pawl-and-ratchet mechanism to view, part of the top section being cut away to show the ratchet.

The reference-letter $a$ denotes the base section, which is, by preference, rectangular in general outline and is adapted to rest upon the floor and remain stationary while the upper sliding section, $f$, is held in position or while being operated. The two right and left hand walls $b$ of the stationary outer section, $a$, are provided with vertical ratchets $c$. A pair of toggle-jointed levers, $d$ $d'$, are fulcrumed in boxes $e$, attached to the inner walls of the vertically-movable sliding section $f$. A laterally-extending bar, $h$, is hinged to the upper end of the top of each of the levers $d$ and passes through openings $i$ in the sliding section. A coil-retracting spring, $k$, surrounds each of these bars and has its opposite ends attached to the bar and sides of the sliding section. Said laterally-extending bars are further provided with pushing-handles $j$ upon their outer extremities, which handles are surrounded by recesses $o$ to enable the operator to more readily seize them.

Each lower lever, $d$, is fulcrumed in the boxes $e$, like the upper one, and the lower end is provided with a cross-arm, $y$, having upon its opposite extremities the dogs or catches $l$, which project through openings $c'$ and engage corresponding teeth in the ratchet-bars $c$. The ratchet-bars and double catches thus located wide apart prevent the seat from tilting and thereby form a more stable support, and by providing the two catches upon the end of the horizontal bars, with the lever attached to the middle of the bar, both catches are released simultaneously by one inward movement. These various parts form a compound spring-actuated pawl for engaging the teeth upon the ratchet-bars. The levers $d$ are provided with longitudinal slots $z$ in their lower extremities to facilitate the action of the compound lever.

The teeth $a'$ of the ratchets are given an upward pitch like a saw, which allows the catches to slide freely over them while the inner section is ascending, but causes them to engage the horizontal shoulders $a''$ when the inner section is moved downward, except when the catches are freed from the teeth by pushing inward on the handles $j$.

When the seat-section is down upon the base, the catches of the lower levers, $d'$, engage the lower walls of rectangular recesses $x$ at the lower extremities of the ratchet-bars, as will be observed in Fig. 2; and when the inner sliding section has been raised almost out of the base and the pawls or catches have passed entirely over the entire set of teeth upon the ratchet-bars, then they snap into the rectangular recesses $x'$ at the upper extremities of the ratchet-bars, which recesses correspond with the lower ones, $x$, and prevent the movable section from movement up or down until the pawls are released therefrom by inward pressure upon the handles $j$.

The upper sliding section, $f$, is made to fit closely within the lower base section, $a$, and is provided with shoulders $n$, which rest snugly upon the top of the base. The top of the inner sliding section is provided with the usual partition, $q$, having a central opening, $r$. This board is covered by a perforated inner cover, $s$, which fits snugly within the recess $t$, and is itself inclosed by the outer main cover, $u$. The recess $t$, within which the cover fits, is located a slight distance above the partition $q$, thereby leaving an intervening chamber or open space, $w$, for the reception of matter which might otherwise escape the vessel below.

The preferred manner of constructing my device having been set forth, I will now proceed to describe its operation.

When out of service, the upper sliding section, $f$, remains down upon the stationary base $a$, and all appearance of a commode is thus eliminated, but at the same time the seat will accommodate a small person. When, however, it is desired to elevate the sliding seat-section, the operator has simply to press inwardly with both hands upon the handles $j$, and by this movement the levers are actuated to release the catches from the recesses $x$, as shown in dotted lines in Fig. 1, after which this section may be moved upwardly and the catches will slide freely over the ratchet-teeth $a'$ until they snap into the rectangular recesses $x'$ in the top of the rack above the saw-like teeth $a'$, and when the catches are in these rectangular recesses $x'$ the teeth will equally impinge upon the upper walls and arrest further upward movement of the seat, and the latter cannot be disengaged until the catches are released by pushing inwardly upon the operating-handles $j$. The downward movement of the seat is accomplished by holding the catches clear of the ratchets, or else they will engage the latter and arrest the movement of the seat. By this arrangement it will be observed that the seat can be elevated and adjusted to various heights in order to accommodate either adults or children. The covers $s$ and $u$ are hinged and operated in the usual well-known manner, and do not require further description.

It is obvious that my invention can be changed in many ways which might suggest themselves to a skilled mechanic; hence I do not limit myself to the precise construction herein shown; but, Having described the preferred mode of putting it into practice, what I claim as new, and desire to secure by Letters Patent, is—

1. In a commode, a stationary base provided with ratchet-bars, in combination with a vertically-movable seat provided with spring-pawls having cross-bars upon their lower extremities and catches upon the opposite ends of said bars, arranged in the manner and for the purpose described.

2. In a commode, a stationary base having ratchet-bars upon its interior, in combination with a sliding seat portion provided with spring-actuated pawls having cross-bars upon their lower extremities, and pulls for releasing said pawls, substantially as described.

3. In a commode, a stationary base portion provided with ratchet-bars upon opposite sides thereof, in combination with an inner sliding seat-section having a pair of levers pivoted thereto and pivoted to each other, the free end of one of said levers engaging the ratchets of the base portion, substantially as described.

4. In a commode, a stationary base portion provided with ratchets, in combination with a sliding seat-section having a pair of levers pivoted thereto and also pivoted to each other, one of said levers acting as a pawl to engage said ratchets, and the other being provided with a pull for releasing said pawl, in the manner and for the purpose set forth.

In testimony whereof I affix my signature in presence of two witnesses.

JOHN A. BELL.

Witnesses:
A. R. FREEMAN,
H. H. GOODRICH.